United States Patent
Klein

(10) Patent No.: US 10,210,621 B2
(45) Date of Patent: Feb. 19, 2019

(54) NORMALIZED PROBABILITY OF CHANGE ALGORITHM FOR IMAGE PROCESSING

(71) Applicant: The Boeing Company, Chicago, IL (US)

(72) Inventor: Robert James Klein, Berkeley, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/105,674

(22) Filed: Aug. 20, 2018

(65) Prior Publication Data
US 2018/0357774 A1  Dec. 13, 2018

Related U.S. Application Data

(62) Division of application No. 15/007,186, filed on Jan. 26, 2016, now Pat. No. 10,055,846.

(51) Int. Cl.
G06K 9/00    (2006.01)
G06T 7/32    (2017.01)
G06T 7/30    (2017.01)

(52) U.S. Cl.
CPC ............... *G06T 7/32* (2017.01); *G06T 7/30* (2017.01); *G06T 2207/10024* (2013.01); *G06T 2207/10048* (2013.01); *G06T 2207/30181* (2013.01)

(58) Field of Classification Search
None
See application file for complete search history.

(56) References Cited

PUBLICATIONS

Im et al., "A change detection model based on neighborhood correlation image analysis and decision tree classification", Remote Sensing of Environment 99 (2005) 326-340 (Year: 2005).*
"GDAL—Geospatial Data Abstraction Library," accessed Jan. 24, 2016, 3 pages. http://www.gdal.org/.
"Broadband Greenness (Using ENVI)," Harris Geospatial Solutions, accessed Jan. 24, 2016, 7 pages. http://www.exelisvis.com/docs/BroadbandGreenness.html.
"Normalized Difference Vegetation Index," accessed Jan. 24, 2016, 7 pages. https://en.wikipedia.org/wiki/Normalized_Difference_Vegetation_Index.
Rocchini et al., "Relief effects on aerial photos geometric correction," Applied Geography 25, 2005, pp. 159-168.
Armenakis et al., "Change Detection Methods for the Revision of Topographic Databases," Symposium on Geospatial Theory, Processing and Applications, Ottawa, 2002, 6 pages.
"Terrain Roughness—13 Ways," GIS 4 Geomorphology, accessed Nov. 10, 2015, 10 pages. http://gis4geomorphology.com/roughness-topographic-position/.

* cited by examiner

*Primary Examiner* — Soo Jin Park
(74) *Attorney, Agent, or Firm* — Yee & Associates, P.C.

(57) ABSTRACT

A method for detecting changes in geospatial imagery. An imaging device is operated to take two images of a single location. The two images are received at processor, which normalizes the visible band and near infrared band of the two images. The two images are registered. Corresponding pixels of the two images are divided into a first group with slope and a second group without slope. Slope groupings are compared to determine which corresponding pixels have a probability of change greater than a predetermined threshold. Vector polygons are created based on the comparing slope groupings, to indicate areas of change in the two images. The areas of change in the two images are displayed on a display device.

16 Claims, 8 Drawing Sheets

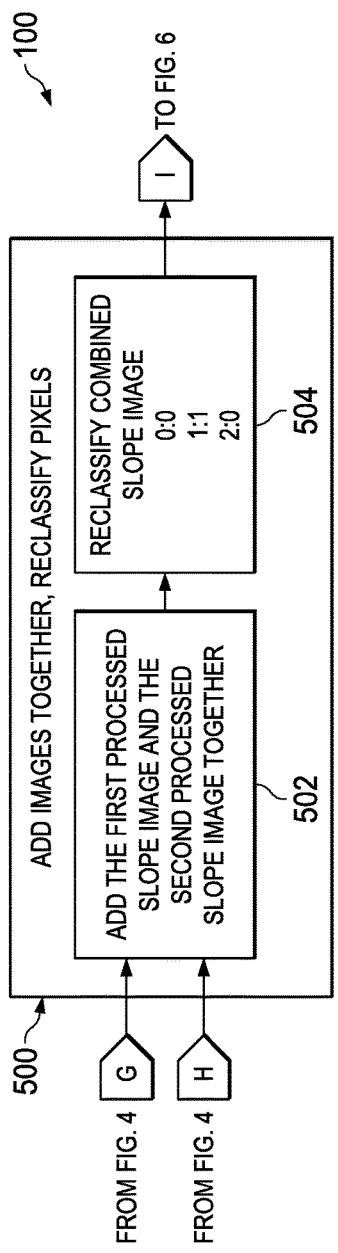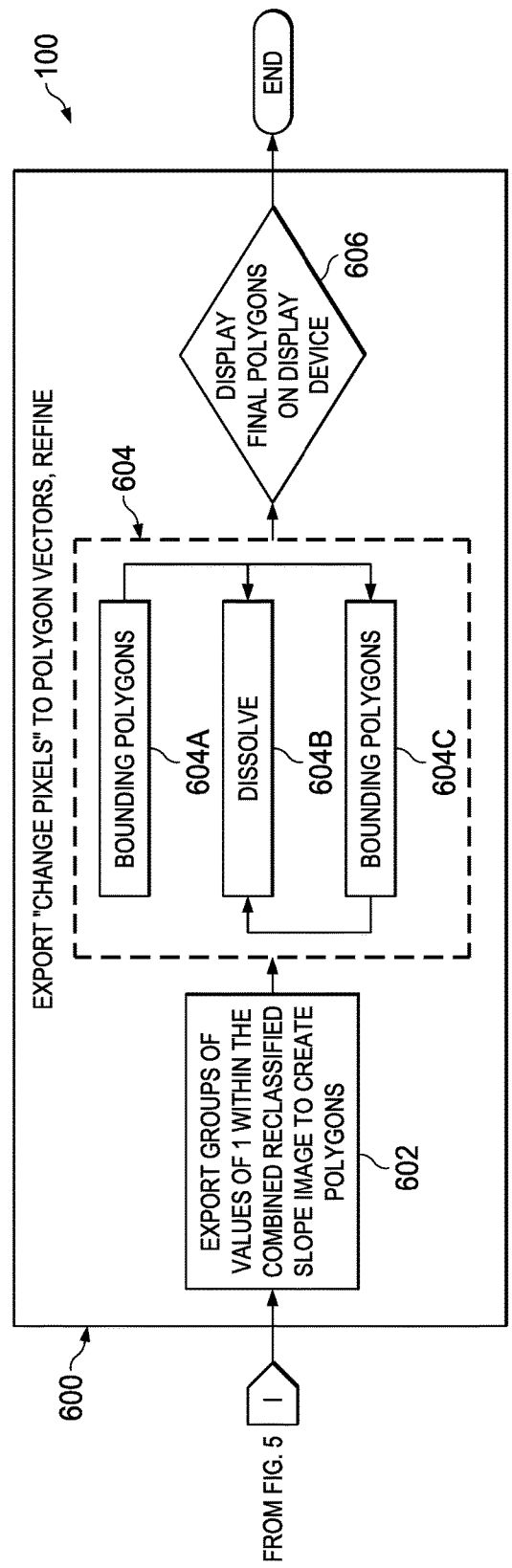

NORMALIZED PROBABILITY OF CHANGE ALGORITHM FOR IMAGE PROCESSING

This application is a divisional of U.S. patent application Ser. No. 15/007,186, filed Jan. 26, 2016, now U.S. Pat. No. 10,055,846, which is incorporated herein by reference in its entirety.

BACKGROUND INFORMATION

1. Field

The present disclosure relates to methods and devices for improving image registration tools and using geomorphical algorithms to nominate areas that have a high probability of change between two georegistered images.

2. Background

Methods for performing image processing have been used in many different applications, including agricultural and military applications. For example, an image may be taken over an area and automated methods used to identify features of interest in the image, such as buildings, automobiles, fields, or other objects. However, using a single image to automatically detect such objects may present difficulties in correctly assigning pixels to objects, leading to errors in the result of the automatic object detection process. A pixel may be a single point in an image.

One method to improve the result of the automatic change detection between images is to register two different images of the same physical location to each other, and then correlate corresponding pixels in the two images to enhance the probability that a given pixel of the combined image is correctly assigned to a given object. However, this method also has drawbacks. Existing change detection methods tend to attempt to isolate pixels that have changed, rather than areas of change. Correctly identifying areas of change would be more useful. Additionally, existing registration methods may contain many false positive change nominations, or detections. Many of the false positives would be a result of variations of any or all of the following: collection characteristics (altitude, obliquity, and others); temporal characteristics (sun angle, minor seasonal changes, and others); and post processing/display (stretch or resampling method).

Furthermore, when using known registering techniques, geospatial imagery is unnecessarily retaken regularly because it is not known whether a given image of an area has changed since a previous image of the area was taken. Retaking these images may be expensive.

Thus, new methods, techniques, and devices are desired to increase the accuracy of image processing and to avoid unnecessarily retaking geospatial images. Additional methods, techniques, and devices are desired to increase the accuracy of techniques for detecting changes between images, and to address the issues described above.

SUMMARY

The illustrative embodiments provide for a method for detecting changes in geospatial imagery. The method may include operating an imaging device to obtain two images of a single location. The method may further include receiving, at a processor, the two images. The method may further include normalizing, by the processor, a visible band and near infrared band of the two images. The method may further include registering, by the processor, the two images. The method may further include dividing, by the processor, corresponding pixels of the two images into a first group with slope and a second group without slope. The method may further include comparing, by the processor, slope groupings to determine which corresponding pixels have a probability of change greater than a predetermined threshold. The method may further include creating, by the processor, vector polygons, based on comparing slope groupings, to indicate areas of change in the two images. The method may further include displaying, on a display device in communication with the processor, the registered image and the polygons denoting a probability of change above a threshold.

The illustrative embodiments provide for an alternative method. The alternative method includes operating at least one device to obtain a first optical image of a location and a second optical image of the location. The alternative method may also include normalizing, with a processor, the first optical image to form a normalized first image and the second optical image to form a normalized second image. The alternative method may also include performing, by the processor, image matching for the first normalized image and the second normalized image to produce vector controls. The alternative method may also include performing, by the processor, registration of the first normalized image to the second normalized image, wherein a registered image is formed. The alternative method may also include calculating, by the processor, a first slope image from the first normalized image and a second slope image from the second normalized image. The alternative method may also include refining, by the processor, the first slope image into a first set of binary values based on a first threshold, and refining the second slope image into a second set of binary values based on a second threshold. The alternative method may also include adding, by the processor, the first slope image and the second slope image, wherein a third set of values is produced having values of zero, one, or two. The alternative method may also include changing, by the processor, all values of two to zero, wherein a fourth set of values is created that are either zero or one. The alternative method may also include thereafter, creating, by the processor, a polygon around a group of pixels that have a value of one. The alternative method may also include displaying, on a display device in communication with the processor, the registered image and the polygons denoting a probability of change above a threshold.

The illustrative embodiments also provide for a system. The system includes at least one imaging device configured to take a first optical image of a location and a second optical image of the location. The system also includes a computer in communication with the at least one imaging device, the computer comprising a processor in communication with a non-transitory computer readable storage medium. The non-transitory computer readable storage medium stores program code which, when executed by the processor, is configured to normalize the first optical image to form a normalized first image and the second optical image to form a normalized second image. The program code is further configured to perform image matching for the first normalized image and the second normalized image to produce vector controls. The program code is further configured to perform registration of the first normalized image to the second normalized image, wherein a registered image is formed. The program code is further configured to calculate a first slope image from the first normalized image and a second slope image from the second normalized image. The program code is further configured to refine the first slope image into a first set of binary values based on a first threshold, and refining the second slope image into a second set of binary values based on a second threshold. The program code is further configured to add the first slope image and the second slope image, wherein a third set of values is produced having values of zero, one, or two. The program code is further configured to change all values of two to zero, wherein a fourth set of values is created that are either zero or one. The program code is further configured to thereafter create a polygon around a group of pixels that have a value of one. The system also includes a display device in communication with the processor, the display device configured to display the registered image having the polygon.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is part of a flowchart of a process for finding areas of change in two geospatial images of a location, in accordance with an illustrative embodiment;

FIG. 6 is part of a flowchart of a process for finding areas of change in two geospatial images of a location, in accordance with an illustrative embodiment;

DETAILED DESCRIPTION

Figure 1:
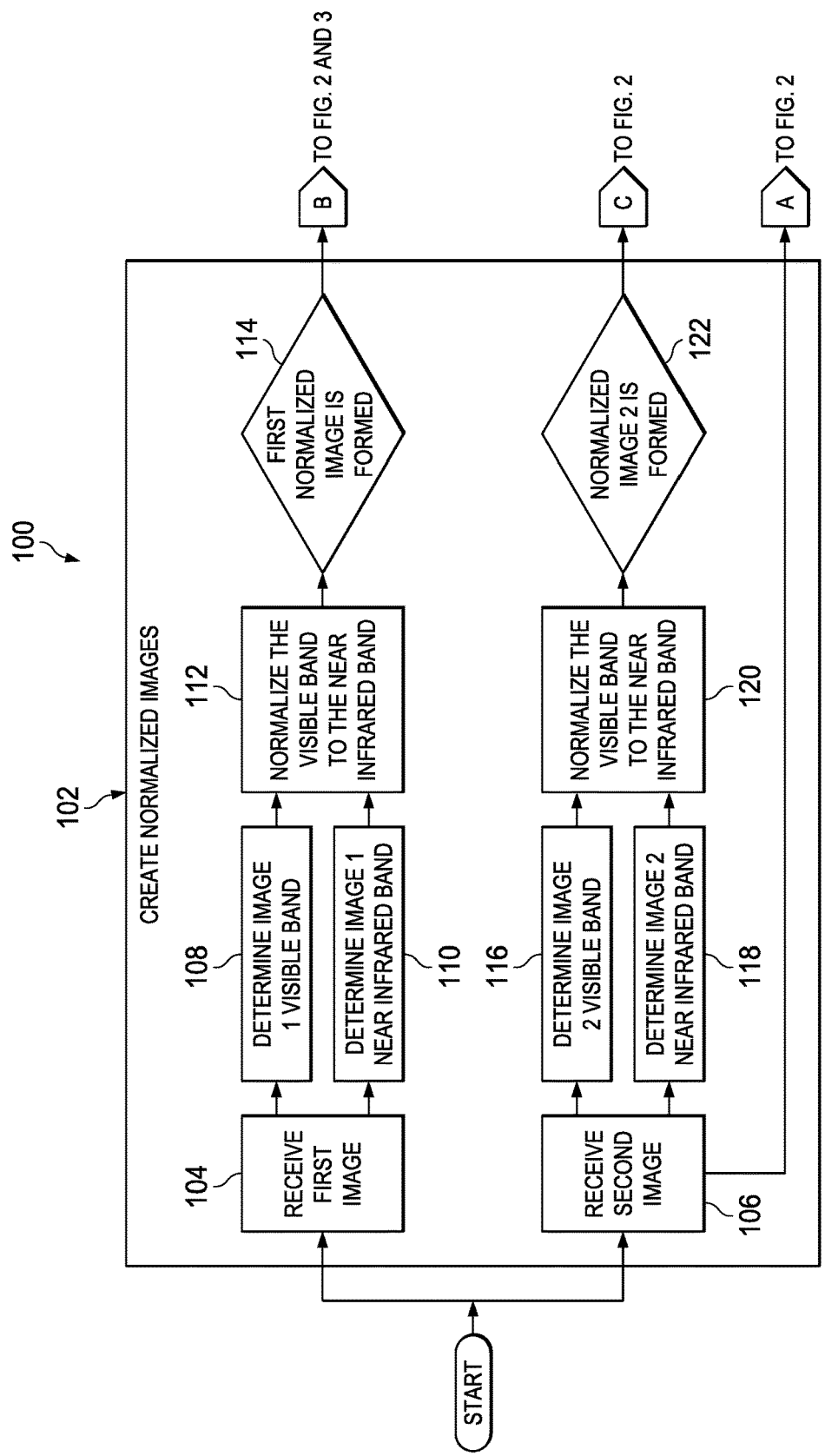
FIG. 1 is part of a flowchart of a process for finding areas of change in two geospatial images of a location, in accordance with an illustrative embodiment.

The illustrative embodiments recognize and take into account that existing change detection tools tend to attempt to isolate pixels that have changed, rather than to determine areas of change in the image. Often, existing automatic image registration tools or image matching tools tend to have very narrow conditions in which they work. For example, such tools often require the images to already be in very close alignment. The normalization pre-process of the illustrative embodiments described herein removes shadow effects, boosts contrast, and compensates for some variation in the spectral characteristics, which eases the strict conditions sometimes imposed during image registration or image matching. The illustrative embodiments further recognize and take into account that most existing image change detection solutions contain an undesirable number of false positive change nominations, or directions. The illustrative embodiments further recognize and take into account that geospatial imagery is sometimes unnecessarily retaken regularly because it is not known whether a given image has changed since the previous capture of the image. Retaking these images at full resolution is expensive.

The illustrative embodiments address these and other issues. For examples, the process of the illustrative embodiments in practice has produced fewer false positives than using individual known image change detection techniques. The illustrative embodiments may make existing image registration tools and geomorphological algorithms work better by nominating areas that have a high probability of change between two georegistered images. The illustrative embodiments address issues of nominating areas that have changed between temporally separated image pairs. Additionally, the illustrative embodiments use a preprocess that improves the registration of existing image matching algorithms.

The illustrative embodiments treat electro-optical imagery as terrain and calculate slopes between pixel values to determine if an area is rough or smooth. The illustrative embodiments may then add the images together to produce a yes/no solution to whether a given area on an image represents a change or no change.

Stated differently, the illustrative embodiments may calculate the rise in individual pixels of two images and determine if there is a slope in the pixels. The pixels are then combined and classified according to a likelihood of change in the pixel. Thus, the illustrative embodiments provide for a system and technique to determine which ground sections in an image have changes so that additional images may be retaken only when needed.

Stated still differently, the illustrative embodiments may create a terrain map of pixels for two images. The slope of each pixel is calculated and classified in a binary manner (no-slope/slope). The terrain pixel maps are then combined to determine which pixels have a good probability of change. The changed pixels are then exported and used to create polygon vectors representing areas for which an image should be retaken.

The illustrative embodiments have a technical effect in that they increase the efficiency of detecting objects in georegistered images. In this manner, processing resources are conserved and the overall process of image management is more efficient, thereby increasing the efficiency of the computers processing the images.

FIG. 1 is part of a flowchart of a process for finding areas of change in two geospatial images of a location, in accordance with an illustrative embodiment. Method 100 may be used to find areas of change in at least two georegistered images of a single location. Method 100 is shown only in part in FIG. 1; method 100 as a whole is shown in the combination of FIG. 1 through FIG. 6. Method 100 may be implemented using a data processing system, such as data processing system 1000 shown in FIG. 10. Method 100, from FIG. 1 through FIG. 6, should be considered as a whole, as method 100 chains processes together and uses slope calculation in a novel and innovative way relative to previous image recognition techniques. Method 100 may be termed a normalized probability of change algorithm, as method 100 may be used to find changes between two georegistered images.

FIG. 1 represents a first operation in method 100. Specifically, FIG. 1 refers to operation 102 of method 100, in which calculations are performed for normalizing two images of the same location. In particular, an image in the visual band is normalized using a second image in either a near infrared or an infrared band.

Because normalization is done to both images, the images are easier to compare directly. Additionally, normalization increases contrast, which increases the efficiency of the succeeding registration step in operation 200 of FIG. 2. One byproduct of this process is the non-normalized new image can be registered using the controls generated from the registration process with the normalized images.

An example of a normalization technique includes using the normalized difference vegetation index (NDVI) to normalize the red band using the near infrared (nir). Another example of a normalization technique is using the green normalized difference vegetation index (GNDVI) to normalize the green band using the near infrared (nir) in a similar manner. An example of an NDVI equation is:

(image1_nir-image1_red)/(image1_nir+image 1_red)

As used herein, the "visible band" corresponds to wavelengths of light which human may perceive as red, green or blue, and thus typically is between about 400 nanometers to about 700 nanometers. As used herein the "near infrared" (nir) refers to wavelengths of light that are between about 700 nanometers to about 5000 nanometers.

Returning to FIG. 1, operation 102 may include a number of sub-operations. A processor may receive a first image (operation 104) and a second image (operation 106). These operations may be performed in series or in parallel, though in the context of method 100 these operations are shown as being taken in parallel.

With respect to the first image, a first image visible band is determined (operation 108) and the first image near infrared band image is determined (operation 110). Again, these operations may be performed in parallel or in series, but are shown as being performed in parallel. Thereafter, an operation is performed to normalize the visible band to the near infrared band by dividing the difference between the near infrared band and the visible band by the sum of the near infrared band and the visible band (operation 112). However, other normalization techniques may be performed. In any case, a first normalized image is formed (operation 114).

With respect to the second image, after operation 106, a second image visible band is determined (operation 116) and the first image near infrared band image is determined (operation 118). Again, these operations may be performed in parallel or in series, but are shown as being performed in parallel. Thereafter, an operation is performed to normalize the visible band to the near infrared band, as described above (operation 120). However, other normalization techniques may be performed. In any case, a second normalized image is formed (operation 122).

Figure 2:
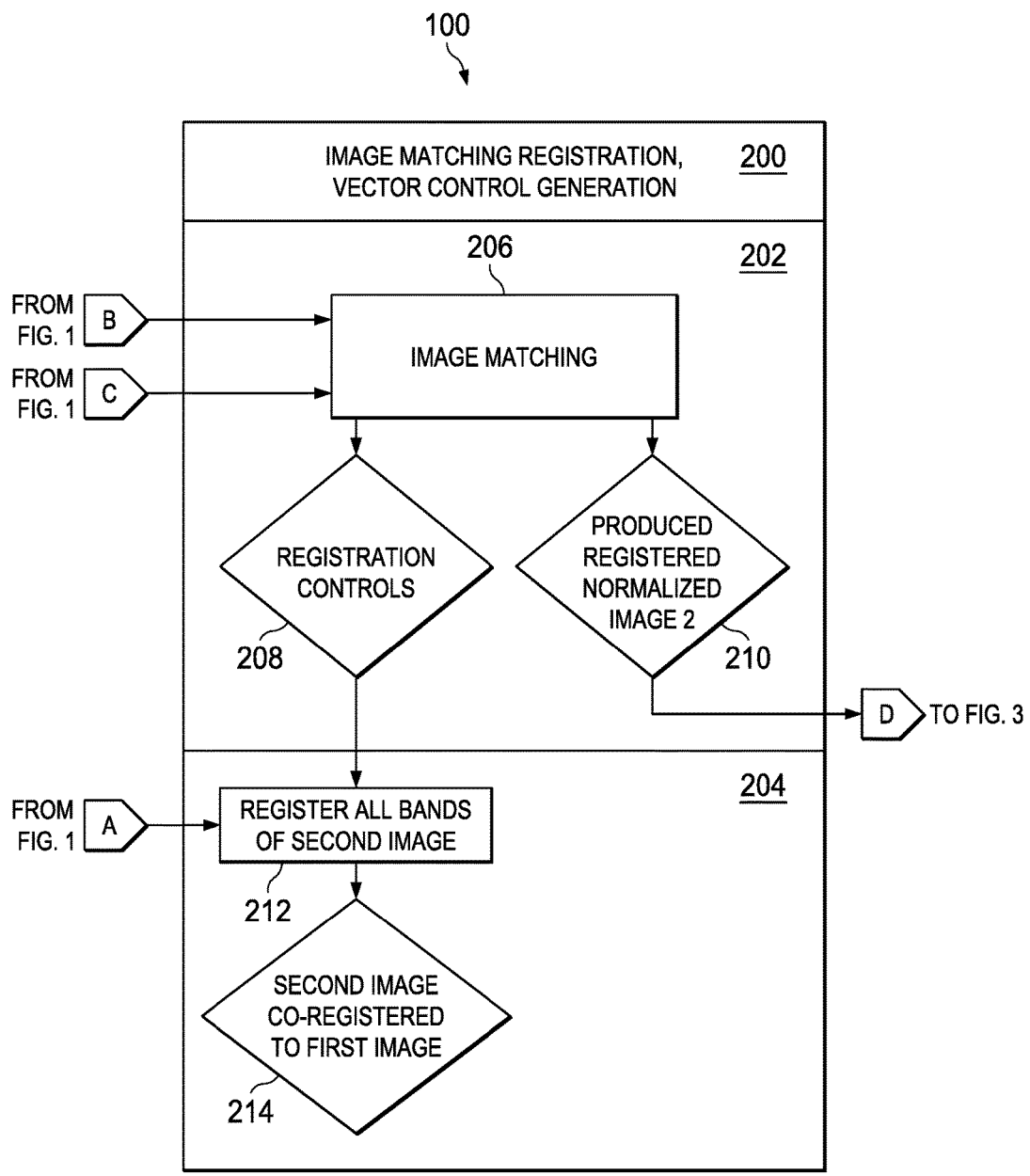
FIG. 2 is part of a flowchart of a process for finding areas of change in two geospatial images of a location, in accordance with an illustrative embodiment.

FIG. 2 is part of a flowchart of a process for finding areas of change in two geospatial images of a location, in accordance with an illustrative embodiment. Method 100 may be used to find areas of change between at least two georegistered images of a single location. Method 100 is shown only in part in FIG. 2; method 100 as a whole is shown in the combination of FIG. 1 through FIG. 6. Method 100 may be implemented using a data processing system, such as data processing system 1000 shown in FIG. 10.

FIG. 2 represents a second operation in method 100. Specifically, FIG. 2 refers to operation 200 of method 100, in which image matching and registration, as well as vector control generation are performed. Image matching is performed at operation 202 and registration is performed at operation 204.

Attention is first turned to image matching (operation 202). The inputs of operation 202 are the single-band normalized images from operation 102, and the outputs of operation 202 are vector controls. Each vector contains two coordinates: a "from coordinate" of a location on the first image and a "to coordinate" of the location on the second image that corresponds to the coordinate in the first image. The controls are used to register the original image. The registration algorithm should produce one or many control vectors.

Continuing from operation 114 and operation 122 of FIG. 1, the first and second normalized images are provided to the processor, which performs image matching (operation 206). The result is registration controls (operation 208), which are used in the image registration performed at operation 204. Additionally, a registered normalized second image is produced (operation 210) which is used in operation 300 of method 100, shown in FIG. 3.

Turning now to image registration at operation 204, the two images are registered to each other. For example, a warp functionality may use the control vectors from operation 202 to transform or register or correct the positions of the original image (the second image), as opposed to the normalized image. Registration can be phased using multiple registrations, as long as the controls are applied in an acceptable order, such as ascending order polynomials.

Continuing from operation 106 of FIG. 1 (receiving the second image), and further based on input from the registration controls generated at operation 208, the processor may register all bands of the second image (operation 212). As a result, the second image is co-registered to the first image (operation 214).

Figure 3:
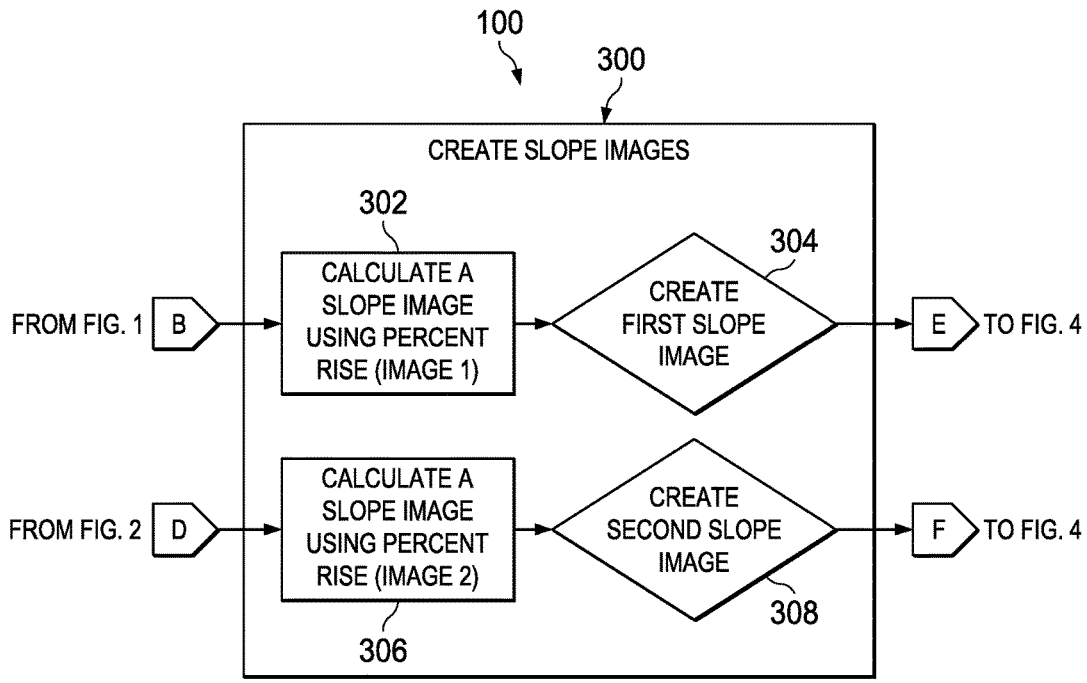
FIG. 3 is part of a flowchart of a process for finding areas of change in two geospatial images of a location, in accordance with an illustrative embodiment.

FIG. 3 is part of a flowchart of a process for finding areas of change in two geospatial images of a location, in accordance with an illustrative embodiment. Method 100 may be used to find areas of change in at least two georegistered images of a single location. Method 100 is shown only in part in FIG. 3; method 100 as a whole is shown in the combination of FIG. 1 through FIG. 6. Method 100 may be implemented using a data processing system, such as data processing system 1000 shown in FIG. 10.

FIG. 3 represents a third operation in method 100. Specifically, FIG. 3 refers to operation 300 of method 100, in which slope images are derived.

In operation 300, the images may be treated as a terrain. Thus, the processor may calculate a percent rise for each pixel between the first and second images. Note that the slopes are calculated on each image independently and later reclassified and added, as described further below. This operation operates on each of the single band normalized images (the first normalized image and the second normalized image. The output of operation 300 is a set of floating point (decimal) values that are in a range between zero to one, with one representing being 100%. This operation shows the level of crowding, roughness, or change within an area in the image.

Returning to FIG. 3, operation 300 may include calculating a first slope image using a percent rise in pixels from the first normalized image (operation 302). The result of this operation is to create a first slope image (operation 304). This result is used during operation 400 of method 100, shown in FIG. 4.

Simultaneously, or in parallel, operation 300 may also include calculating a second slope image using a percent rise in pixels from the second normalized image (operation 306). The result of this operation is to create a second slope image (operation 308). This result is used during operation 400 of method 100, shown in FIG. 4.

Figure 4:
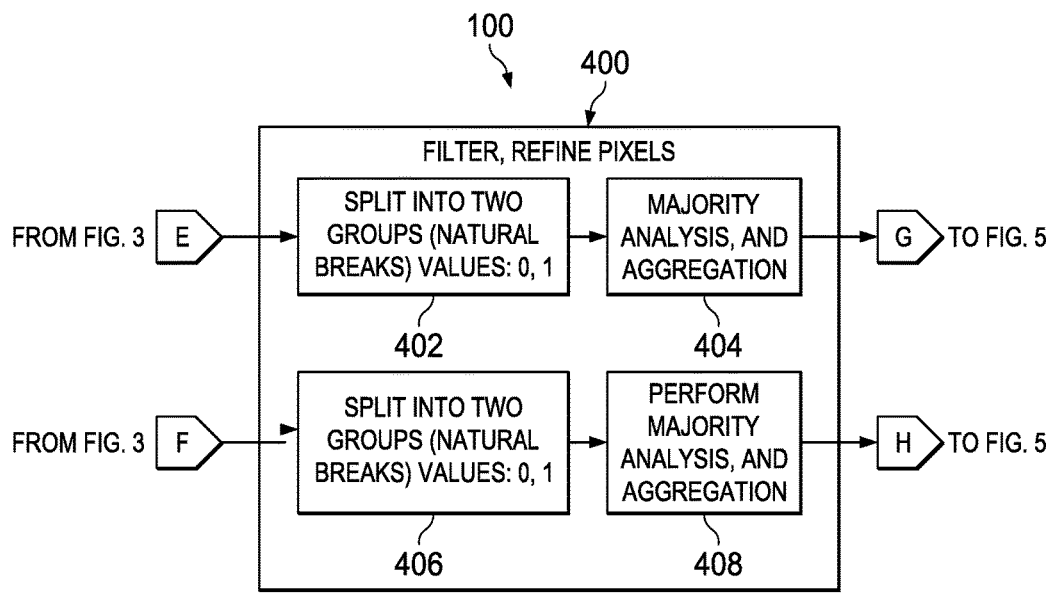
FIG. 4 is part of a flowchart of a process for finding areas of change in two geospatial images of a location, in accordance with an illustrative embodiment.

FIG. 4 is part of a flowchart of a process for finding areas of change in two geospatial images of a location, in accordance with an illustrative embodiment. Method 100 may be used to find areas of change in at least two georegistered images of a single location. Method 100 is shown only in part in FIG. 4; method 100 as a whole is shown in the combination of FIG. 1 through FIG. 6. Method 100 may be implemented using a data processing system, such as data processing system 1000 shown in FIG. 10.

FIG. 4 represents a third operation in method 100. Specifically, FIG. 4 refers to operation 400 of method 100, in which the pixels of the two slope images are filtered and refined.

In operation 400, a threshold is used to split the values of the two slope images into binary values. Thus, every value in each of the first slope image and the second slope image are given a value of zero or one, representing sloped and not sloped values accordingly. An example threshold may be a standard deviation or simple average between corresponding pixels of the two sloped images, though other methods may be used.

Again, sloped values are assigned 1, not sloped values are assigned 0. Sloped values would indicate there are objects in an area (and may represent vegetation, buildings, cars, and many others). Not sloped values would indicate that there are few or no objects in an area (and may represent a parking lot, open field, dirt, and many others). Majority analysis may be performed on pixels in the two sloped images to aggregate and refine the results. As a result, noise in the images is reduced.

Returning to FIG. 4, the values in the first slope image derived at operation 304 of FIG. 3 is split into two groups between values of zero and one based on a first threshold (operation 402). Thereafter, the processor may perform majority analysis and aggregation to reduce noise in the resulting processed first slope image (operation 404). The result is used in operation 500 of method 100, shown in FIG. 5.

In parallel or in series, the values in the second slope image derived at operation 308 of FIG. 3 is split into two groups between values of zero and one based on a second threshold (operation 406). The first and second thresholds may be the same value, though these thresholds are given different names for purposes of clarity. Nevertheless, if advantageous, the first and second thresholds need not be the same. In any case, thereafter, the processor may perform majority analysis and aggregation to reduce noise in the resulting processed second slope image (operation 408). The result is used in operation 500 of method 100, shown in FIG. 5.

FIG. 5 is part of a flowchart of a process for finding areas of change in two geospatial images of a location, in accordance with an illustrative embodiment. Method 100 may be used to find areas of change in at least two georegistered images of a single location. Method 100 is shown only in part in FIG. 5; method 100 as a whole is shown in the combination of FIG. 1 through FIG. 6. Method 100 may be implemented using a data processing system, such as data processing system 1000 shown in FIG. 10.

FIG. 5 represents a fifth operation in method 100. Specifically, FIG. 5 refers to operation 500 of method 100, in which the two processed slope images are added together and in which pixels are reclassified.

Each corresponding value in the first processed slope image and the second processed slope image are added together (operation 502). The result is a single combined slope image represented by a third set of values, of which all are one of zero, one, or two. For example, if a particular value of a pixel in the first slope image is 1 and the corresponding value of that pixel in the second slope image is also 1, then the resulting value is 2. Likewise, if a particular value of a pixel in the first or second slope image is 1 and the corresponding value of that pixel in the other slope image is 0, then the resulting value is 1. Likewise, if a particular value of a pixel in the first slope image is 0 and the corresponding value of that pixel in the second slope image is also 0, then the resulting value is 0.

The resulting combined slope image is then reclassified (operation 504), with the result used in operation 600 of method 100, shown in FIG. 6. In this reclassification, all values of two are changed to zero. It is assumed that if the corresponding pixel in both slope images is one (which results in the value of two in the combined slope image), then the image is not changing substantially. As a result, it is assumed that the same object is being recorded and the pixel does not represent a boundary of the object. Accordingly, a value of 2 is reclassified to a value of 0 to indicate little or no probability of change in the image.

The other values of zero and one in the combined slope image are left unchanged. It is assumed that there are not objects of interest in pixels having a combined value of zero. It is also assumed that a value of 1, which represents a change in slope between corresponding pixels in the two images, represents a possible boundary of an object of interest.

FIG. 6 is part of a flowchart of a process for finding areas of change in two geospatial images of a location, in accordance with an illustrative embodiment. Method 100 may be used to find areas of change in at least two georegistered images of a single location. Method 100 is shown only in part in FIG. 6; method 100 as a whole is shown in the combination of FIG. 1 through FIG. 6. Method 100 may be implemented using a data processing system, such as data processing system 1000 shown in FIG. 10.

FIG. 6 represents a sixth operation in method 100. Specifically, FIG. 6 refers to operation 600 of method 100, in which polygon vectors are generated, refined, and then displayed. The polygon vectors are drawn around possible objects of interest in order to highlight them to a user. In an illustrative embodiment, the polygon vectors may take the form of circles over areas in the image with a probability of change.

Based on the reclassified combined slope image derived in operation 504 of FIG. 5, the pixels which have a value of 1 in the reclassified combined slope image are grouped and exported. From there, bounding polygons are created, dissolved, and recreated to aggregate change areas that touch each other. The final output may be circular, or other shaped polygons around areas in the original image that represent areas having a high likelihood of change—thereby representing a possible object of interest. The magnitude of the probability may be defined by an area within a polygon, in map units.

Stated differently, in operation 600, the processor may convert the combined slope image from a raster format to a polygon vector format. The processor may use the polygon vector data to create bounding circles over all contiguous polygons with value of 1, representing a probability of change. The processor may then dissolve contiguous or overlapping bounding circles, and create new bounding circles. This process results in circles over areas with a probability of change. The magnitude of change is defined as the area of each circle. In other words, the larger circles contain a higher magnitude of probability of change. The result may be correlated to the original image and then the image with circled areas presented to a user via a display device.

Returning to FIG. 6, from the combined reclassified slope image derived from operation 504, the processor may export groups of values of 1 within the combined reclassified slope image to create polygons (operation 602). Additional processing is then performed at operation 604. Specifically, the processor may perform bounding of polygons (operation 604A), which then may be dissolved (operation 604B), and bounded again (operation 604C). This process of operation 604 may repeat until final polygons converge. Together, the sub-operations in operation 604 may be considered refining the polygon vectors.

Then the final polygons are displayed on a display device (operation 606). These polygons may be registered to one or both of the original images, or to the registered images in operation 200, and displayed so that a user may see possible objects of interest bounded by the polygons. In any case, the process may terminate thereafter.

Figure 7:
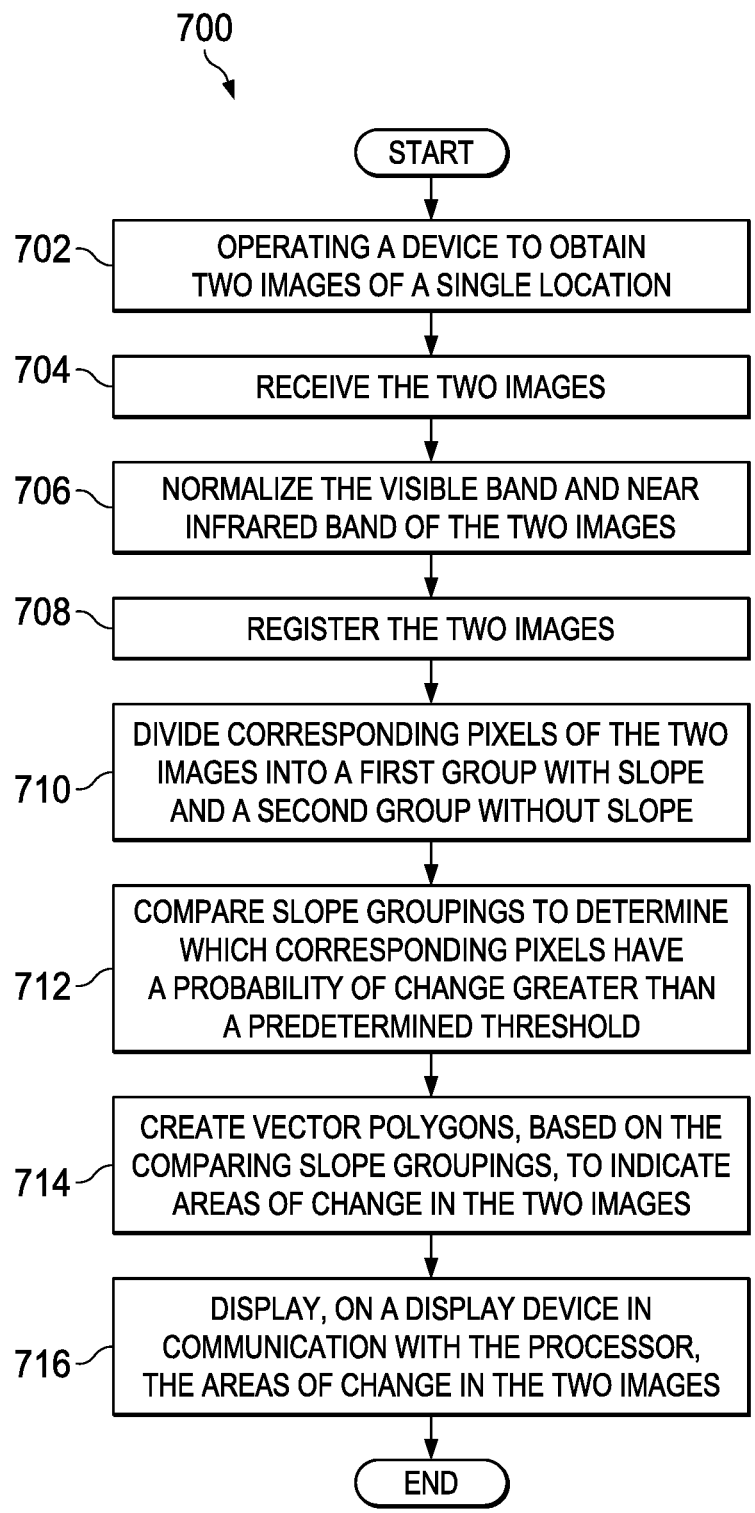
FIG. 7 is an alternative flowchart of a process for finding areas of change in two geospatial images of a location, in accordance with an illustrative embodiment.

FIG. 7 is an alternative flowchart of a process for finding areas of change in two geospatial images of a location, in accordance with an illustrative embodiment. Method 700 may be used to find areas of change in at least two georegistered images of a single location. Method 700 may be implemented using a data processing system, such as data processing system 1000 shown in FIG. 10. Method 700 may be characterized as a method for detecting changes in geospatial imagery.

Method 700 may begin by operating an imaging device to obtain two images of a single location (operation 702). This operation may be commanded by a processor, or may be manually performed by a human operating the imaging device. In an illustrative embodiment, "operating an imaging device" may be operating an imaging device to obtain images. In alternative illustrative embodiments, the two images may be taken from storage, either local or via a network such as a web service. Thus, the illustrative embodiments do not necessarily require operation of an imaging device such as a camera.

Next, the processor may receive the two images (operation 704). The processor then may normalize a visible band and near infrared band of the two images (operation 706) and may register the two images (operation 708).

Then the processor may divide corresponding pixels of the two images into a first group with slope and a second group without slope (operation 710). The processor then may compare slope groupings to determine which corresponding pixels have a probability of change greater than a predetermined threshold (operation 712).

The processor may then create vector polygons, based on the comparing slope groupings, to indicate areas of change in the two images (operation 714). The processor may then cause displaying, on a display device in communication with the processor, the areas of change in the two images (operation 716). In other words, the processor may cause displaying, on a display device, the registered image and the polygons denoting a probability of change above a threshold. The threshold may be a value which the user or some other automatic process determines is a "high probability". However, the threshold may be any value determined by the user or an automatic process. The process may terminate thereafter.

Method 700 may be varied and may contain more or fewer operations, or different operations. For example, registering may be performed using a graphical path method. In another example, the slope groupings may be only binary, consisting only of the first group and the second group.

In an expanded method, method 700 may also include retaking, using the imaging device, a third image that includes the areas of change; and repeating selecting, normalizing, registering, dividing, comparing, and creating using the third image at least one of the two images. An example of this concept, the illustrative embodiments contemplate using an archive shot and new shot, both at a medium or low spatial resolution (typically about 5 meters to about 30 meters), which uses significantly fewer resources than using high resolution images. Thus, the illustrative embodiments allow for identifying the change in the medium or low spatial resolution images, and then only acquiring the changed areas using the resource intensive high resolution imaging device. Next, the high resolution images (about 1 meter and below) may go through the change probability detection process against high resolution archived images. The result is showing only areas that are changed in high resolution images. Thus, the illustrative embodiments are not necessarily limited to the specific examples described above.

Figure 8:
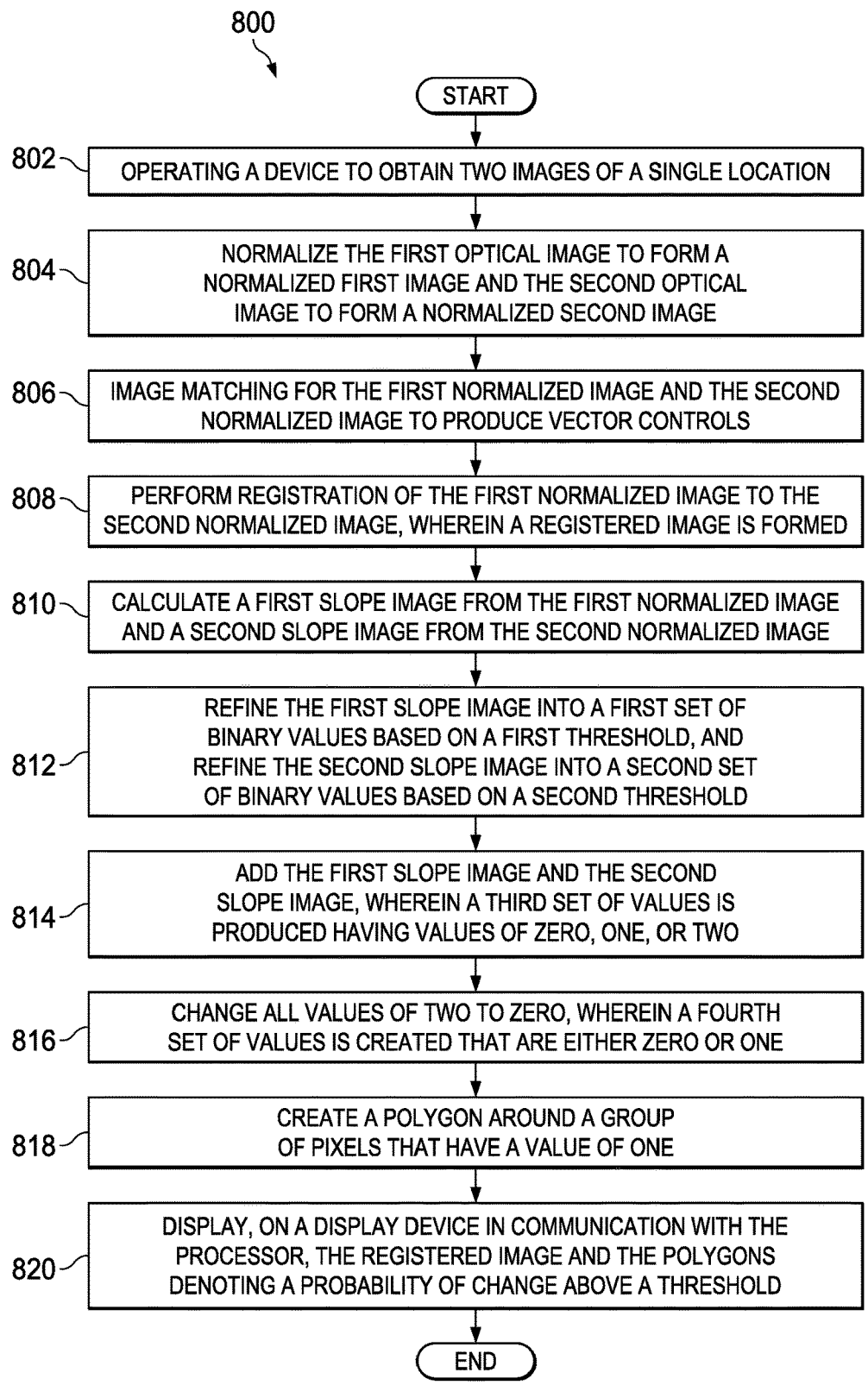
FIG. 8 is an alternative flowchart of a process for finding areas of change in two geospatial images of a location, in accordance with an illustrative embodiment.

FIG. 8 is an alternative flowchart of a process for finding areas of change in two geospatial images of a location, in accordance with an illustrative embodiment. Method 800 may be used to find areas of change in at least two georegistered images of a single location. Method 800 may be implemented using a data processing system, such as data processing system 1000 shown in FIG. 10. Method 800 may be characterized as a method of image processing.

Method 800 may begin by operating an imaging device to obtain two images of a single location (operation 802). This operation may be similar to operation 702 of FIG. 7. This operation may be commanded by a processor, or may be manually performed by a human operating the imaging device.

The processor then may normalize the first optical image to form a normalized first image and the second optical image to form a normalized second image (operation 804). The processor may then perform image matching for the first normalized image and the second normalized image to produce vector controls (operation 806). The processor may then perform registration of the first normalized image to the second normalized image, wherein a registered image is formed (operation 808).

Next, the processor may calculate a first slope image from the first normalized image and a second slope image from the second normalized image (operation 810). The processor may then refine the first slope image into a first set of binary values based on a first threshold, and refining the second slope image into a second set of binary values based on a second threshold (operation 812).

The processor may then add the first slope image and the second slope image, wherein a third set of values is produced having values of zero, one, or two (operation 814).

Next, the processor may change all values of two to zero, wherein a fourth set of values is created that are either zero or one (operation 816).

Thereafter, the processor may create a polygon around a group of pixels that have a value of one (operation 818). The processor may then cause the processor to display, on a display device in communication with the processor, the registered image and the polygons denoting a probability of change above a threshold (operation 820). Stated more simply, the processor may cause the registered image having the polygon to be displayed on a display device. The process may terminate thereafter.

Method 800 may be varied and may contain more or fewer operations, or different operations. For example, the first optical image may be one of a first visible band image and a first near infrared band image, and the second optical image may be one of a second visible band image and a second near infrared band image.

In another example, the first slope image is derived by calculating a percent rise for each pixel in the first normalized image, and the second slope image is derived by calculating a percent rise for each pixel in the second normalized image. In this case, a first result of calculating the first slope image results in a first set of values wherein each of the first set of values is initially in a range between zero and one, and a second result of calculating the second slope image results in a second set of values wherein each of the second set of values is in the range between zero and one. Furthermore, refining the first slope image may include converting the first set of values to either zero or one based on the first threshold, and wherein refining the second slope image comprises converting the first set of values to either zero or one based on the second threshold. Still further, a slope of 1 may indicate a first area of change in the first optical image or in the second optical image, and a slope of 0 may indicate a second area of no change in the first optical image or in the second optical image.

In still another example, refining may include performing a majority analysis on all pixels to aggregate results. In another example, the polygon may bound an area having a change in pixels, thereby indicating a probable presence of an object of interest.

In an expanded method, method 800 creating the polygon may include converting the registered image to vector data for the group of pixels; converting raster data into polygon vector data for the group of pixels; and creating a bounding circle over the polygon. In this case, a plurality of polygons are present, wherein converting the registered image, converting the raster data, and creating a boundary circle is repeated for each of the plurality of polygons. In this case, method 800 may further include dissolving continuous or overlapping boundary circles.

In another variation, an area of the polygon may indicate a magnitude of probability of change in the area. Thus, the illustrative embodiments are not necessarily limited by the specific examples described above.

Figure 9:
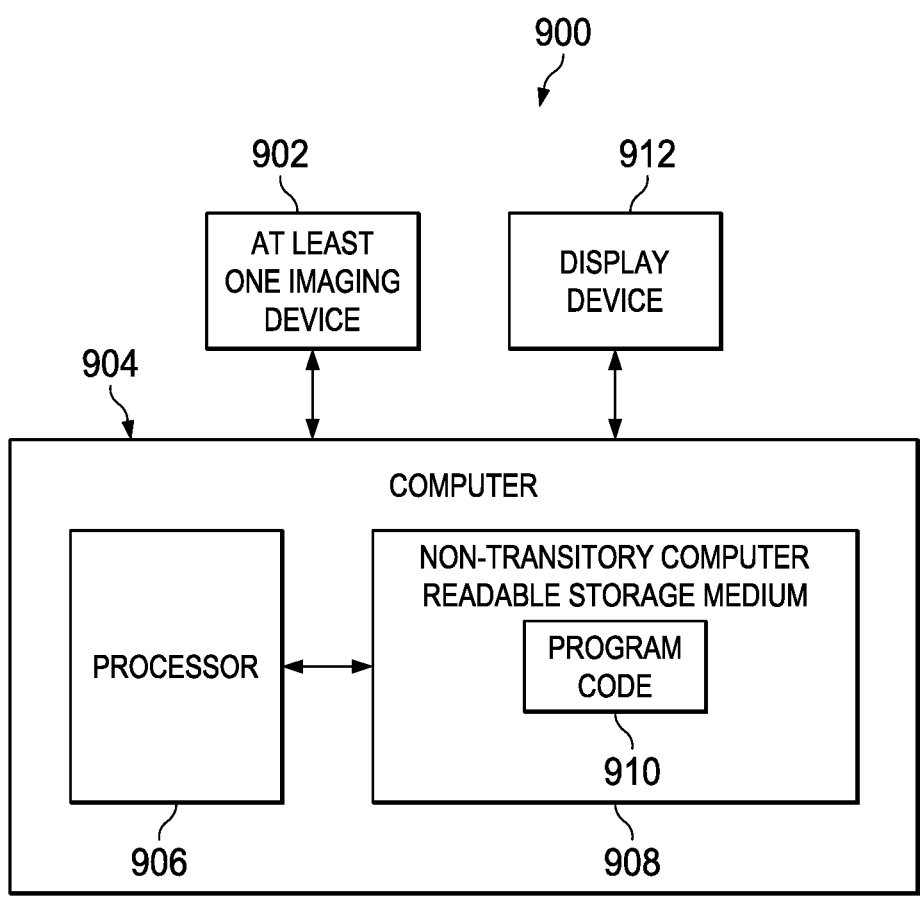
FIG. 9 is block diagram of a system for finding areas of change in two geospatial images of a location, in accordance with an illustrative embodiment.

FIG. 9 is block diagram of a system for finding areas of change in two geospatial images of a location, in accordance with an illustrative embodiment. System 900 may be used to find areas of change in at least two georegistered images of a single location. System 900 may be implemented as data processing system 1000 shown in FIG. 10.

System 900 may include at least one imaging device 902. At least one imaging device 902 may be configured to take a first optical image of a location and a second optical image of the location.

System 900 may also include computer 904 in communication with at least one imaging device 902. Computer 904 includes processor 906 in communication with non-transitory computer readable storage medium 908. Non-transitory computer readable storage medium 908 may store program code 910 which, when executed by the processor, is configured to perform a method.

The program code includes program code for normalizing the first optical image to form a normalized first image and the second optical image to form a normalized second image. The program code also includes program code for performing image matching for the first normalized image and the second normalized image to produce vector controls.

The program code also includes program code for performing registration of the first normalized image to the second normalized image, wherein a registered image is formed. The program code also includes program code for calculating a first slope image from the first normalized image and a second slope image from the second normalized image.

The program code also includes program code for refining the first slope image into a first set of binary values based on a first threshold, and refining the second slope image into a second set of binary values based on a second threshold. The program code also includes program code for adding the first slope image and the second slope image, wherein a third set of values is produced having values of zero, one, or two.

The program code also includes program code for changing all values of two to zero, wherein a fourth set of values is created that are either zero or one. The program code also includes program code for thereafter creating a polygon around a group of pixels that have a value of one.

System 900 also includes display device 912 in communication with processor 906. Display device 912 may be configured to display the registered image and the polygons denoting a probability of change above a threshold, as described above.

System 900 may be varied. For example, first optical image may include one of a first visible band image and a first near infrared band image, and the second optical image may include one of a second visible band image and a second near infrared band image.

In another example, program code 910 may be configured such that first slope image is derived by calculating a percent rise for each pixel in the first normalized image, and the second slope image is derived by calculating a percent rise for each pixel in the second normalized image. In this case, program code 910 may be configured such that a first result of calculating the first slope image results in a first set of values wherein each of the first set of values is initially in a range between zero and one, and wherein a second result of calculating the second slope image results in a second set of values wherein each of the second set of values is in the range between zero and one. Further, program code 910 may be configured such that refining the first slope image comprises converting the first set of values to either zero or one based on the first threshold, and wherein refining the second slope image comprises converting the first set of values to either zero or one based on the second threshold. Thus, the illustrative embodiments are not necessarily limited by the specific examples described above.

Figure 10:
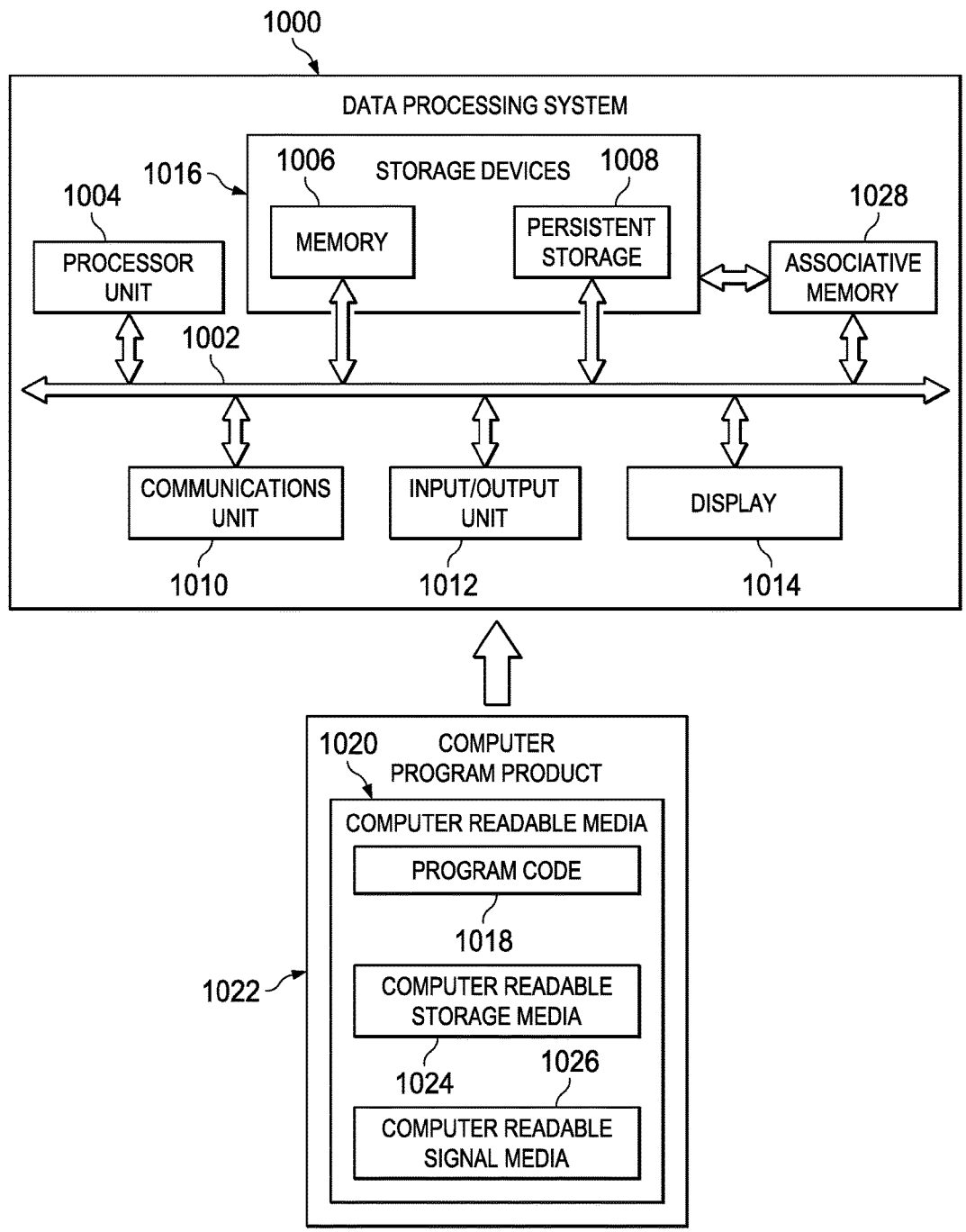
FIG. 10 illustrates a data processing system, in accordance with an illustrative embodiment.

Turning now to FIG. 10, an illustration of a data processing system is depicted in accordance with an illustrative embodiment. Data processing system 1000 in FIG. 10 is an example of a data processing system that may be used to implement the illustrative embodiments, such method 100 shown in FIG. 1 through FIG. 6, as well as the methods shown in FIG. 7 and FIG. 8. Data processing system 1000 may also be used as the processor or computer described with respect to FIG. 9.

In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. This software may be an associative memory, content addressable memory, or software for implementing the processes described elsewhere herein. Thus, for example, software loaded into memory 1006 may be software for executing method 1100 of FIG. 11, method 1200 of FIG. 12, or for implementing the six steps described above with respect to FIG. 4 through FIG. 8. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output (I/O) unit 1012 allows for input and output of data with other devices that may be connected to data processing system 1000. For example, input/output (I/O) unit 1012 may provide a connection for user input through a keyboard, a mouse, and/or some other suitable input device. Further, input/output (I/O) unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026. Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the imaging device is configured to perform the number of operations. The imaging device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1018 may be omitted because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

As another example, a storage device in data processing system 1000 is any hardware apparatus that may store data. Memory 1006, persistent storage 1008, and computer readable media 1020 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006, or a cache, such as found in an interface and memory controller hub that may be present in communications fabric 1002.

Data processing system 1000 may also include associative memory 1028. Associative memory 1028 may be in communication with communications fabric 1002. Associative memory 1028 may also be in communication with, or in some illustrative embodiments, be considered part of storage devices 1016. While one associative memory 1028 is shown, additional associative memories may be present.

As used herein, the term "associative memory" refers to a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. Thus, an associative memory may be configured to be queried based solely on direct relationships, based solely on at least indirect relationships, as well as based on combinations of direct and at least indirect relationships. An associative memory may be a content addressable memory.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of image processing, comprising:
    operating at least one imaging device to take a first optical image of a location and a second optical image of the location;
    normalizing, with a processor, the first optical image to form a normalized first image and the second optical image to form a normalized second image;
    performing, by the processor, image matching for the first normalized image and the second normalized image to produce vector controls;
    performing, by the processor, registration of the first normalized image to the second normalized image, wherein a registered image is formed;
    calculating, by the processor, a first slope image from the first normalized image and a second slope image from the second normalized image;
    refining, by the processor, the first slope image into a first set of binary values based on a first threshold, and refining the second slope image into a second set of binary values based on a second threshold;
    adding, by the processor, the first slope image and the second slope image, wherein a third set of values is produced having values of zero, one, or two;
    changing, by the processor, all values of two to zero, wherein a fourth set of values is created that are either zero or one;
    thereafter creating, by the processor, a polygon around a group of pixels that have a value of one; and
    generating, and communicating to the processor, a registered image and the polygons denoting a probability of change above a threshold.

2. The method of claim 1, wherein the first optical image comprises one of a first visible band image and a first near infrared band image, and wherein the second optical image comprises one of a second visible band image and a second near infrared band image.

3. The method of claim 1, wherein the first slope image is derived by calculating a percent rise for each pixel in the first normalized image, and wherein the second slope image is derived by calculating a percent rise for each pixel in the second normalized image.

4. The method of claim 3, wherein a first result of calculating the first slope image results in a first set of values wherein each of the first set of values is initially in a range between zero and one, and wherein a second result of calculating the second slope image results in a second set of values wherein each of the second set of values is in the range between zero and one.

5. The method of claim 4, wherein refining the first slope image comprises converting the first set of values to either zero or one based on the first threshold, and wherein refining the second slope image comprises converting the first set of values to either zero or one based on the second threshold.

6. The method of claim 5, wherein a slope of 1 indicates a first area of change in the first optical image or in the second optical image, and wherein a slope of 0 indicates a second area of no change in the first optical image or in the second optical image.

7. The method of claim 1, wherein refining comprises performing a majority analysis on all pixels to aggregate results.

8. The method of claim 1, wherein the polygon bounds an area having a change in pixels, thereby indicating a probable presence of an object of interest.

9. The method of claim 1, wherein creating the polygon comprises:
    converting the registered image to vector data for the group of pixels;
    converting raster data into polygon vector data for the group of pixels; and
    creating a bounding circle over the polygon.

10. The method of claim 9, wherein a plurality of polygons are present, wherein converting the registered image, converting the raster data, and creating a boundary circle is repeated for each of the plurality of polygons, and wherein the method further comprises:
    dissolving continuous or overlapping boundary circles.

11. The method of claim 9, wherein an area of the polygon indicates a magnitude of probability of change in the area.

12. A system comprising:
    at least one imaging device configured to take a first optical image of a location and a second optical image of the location;
    a computer in communication with the at least one imaging device, the computer comprising a processor in communication with a non-transitory computer readable storage medium, the non-transitory computer readable storage medium storing program code which, when executed by the processor, is configured to perform a method, the program code comprising:
    program code for normalizing the first optical image to form a normalized first image and the second optical image to form a normalized second image;
    program code for performing image matching for the first normalized image and the second normalized image to produce vector controls;
    program code for performing registration of the first normalized image to the second normalized image, wherein a registered image is formed;
    program code for calculating a first slope image from the first normalized image and a second slope image from the second normalized image;
    program code for refining the first slope image into a first set of binary values based on a first threshold, and refining the second slope image into a second set of binary values based on a second threshold;
    program code for adding the first slope image and the second slope image, wherein a third set of values is produced having values of zero, one, or two;
    program code for changing all values of two to zero, wherein a fourth set of values is created that are either zero or one; and
    program code for thereafter creating a polygon around a group of pixels that have a value of one; and
    a display device in communication with the processor, the display device configured to display the registered image and the polygons denoting a probability of change above a threshold.

13. The system of claim 12, wherein the first optical image comprises one of a first visible band image and a first near infrared band image, and wherein the second optical image comprises one of a second visible band image and a second near infrared band image.

14. The system of claim 12, wherein the program code is configured such that first slope image is derived by calculating a percent rise for each pixel in the first normalized image, and the second slope image is derived by calculating a percent rise for each pixel in the second normalized image.

15. The system of claim 14, wherein the program code is configured such that a first result of calculating the first slope image results in a first set of values wherein each of the first set of values is initially in a range between zero and one, and wherein a second result of calculating the second slope image results in a second set of values wherein each of the second set of values is in the range between zero and one.

16. The system of claim 15, wherein the program code is configured such that refining the first slope image comprises converting the first set of values to either zero or one based on the first threshold, and wherein refining the second slope image comprises converting the first set of values to either zero or one based on the second threshold.

* * * * *